(12) United States Patent
Kuriyama et al.

(10) Patent No.: US 9,242,675 B2
(45) Date of Patent: Jan. 26, 2016

(54) AUTOMOBILE VEHICLE-BODY FRONT STRUCTURE

(71) Applicant: Toyota Jidosha Kabushiki Kaisha, Toyota-shi, Aichi-ken (JP)

(72) Inventors: Tomoyuki Kuriyama, Toyota (JP); Kosuke Sakakibara, Toyota (JP); Akihiro Tamaoki, Tajimi (JP); Masanobu Ohmi, Kasugai (JP); Tatsuya Ayukawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/446,823

(22) Filed: Jul. 30, 2014

(65) Prior Publication Data

US 2015/0035316 A1  Feb. 5, 2015

(30) Foreign Application Priority Data

Aug. 2, 2013 (JP) ................................. 2013-161338

(51) Int. Cl.
*B62D 25/08* (2006.01)
*B62D 21/15* (2006.01)
*B60R 19/34* (2006.01)

(52) U.S. Cl.
CPC ............ *B62D 25/082* (2013.01); *B62D 21/152* (2013.01); *B60R 19/34* (2013.01); *B62D 25/08* (2013.01)

(58) Field of Classification Search
CPC .... B62D 25/08; B62D 25/082; B62D 21/152; B60R 19/34

USPC ................. 296/187.1, 198, 102, 120, 187.09; 293/133, 120, 102

See application file for complete search history.

(56) References Cited

U.S. PATENT DOCUMENTS

| | | | |
|---|---|---|---|
| 7,946,636 B2 * | 5/2011 | Goda et al. ..................... | 293/120 |
| 8,398,153 B1 | 3/2013 | Dandekar et al. | |
| 2003/0025358 A1 | 2/2003 | Taguchi et al. | |
| 2012/0248820 A1 * | 10/2012 | Yasui et al. .............. | 296/187.09 |

FOREIGN PATENT DOCUMENTS

| | | |
|---|---|---|
| JP | 2003-040142 A | 2/2003 |
| JP | 2005-231435 A | 9/2005 |
| JP | 4691964 B2 | 6/2011 |
| JP | 2012-214211 A | 11/2012 |
| WO | 2014/115579 A1 | 7/2014 |
| WO | 2014/115580 A1 | 7/2014 |

* cited by examiner

*Primary Examiner* — Joseph D Pape
*Assistant Examiner* — Dana Ivey
(74) *Attorney, Agent, or Firm* — Dinsmore & Shohl LLP

(57) ABSTRACT

According to a vehicle-body front structure, when a collision load caused at the time of a front end collision is input into a front part of a connecting member fixed to a front end of an apron upper member, a protruding member protruding outwardly in a vehicle width direction from a front part of a side-member main body is able to interfere with the front part of the connecting member from a vehicle rear side. This makes it possible to improve a transmission efficiency of the collision load between the connecting member and the front side member. Besides, the front part of the connecting member is reinforced by a bulk head, thereby making it possible to restrain the front part from being deformed by the collision load.

11 Claims, 7 Drawing Sheets

AUTOMOBILE VEHICLE-BODY FRONT STRUCTURE

INCORPORATION BY REFERENCE

The disclosure of Japanese Patent Application No. 2013-161338 filed on Aug. 2, 2013 including the specification, drawings and abstract is incorporated herein by reference in its entirety.

BACKGROUND OF THE INVENTION

1. Field of the Invention

The present invention relates to an automobile vehicle-body front structure.

2. Description of Related Art

In an automobile front body structure described in Japanese Patent Application Publication No. 2005-231435 (JP 2005-231435 A), a connecting member is extended obliquely downward toward a vehicle front side from a front end of an apron reinforcement (an apron upper member). A front end of the connecting member is placed at a vehicle-width outer side relative to a front side frame (a front side member), and is also placed at the same position as the front side frame in a vehicle front-rear direction and in a vehicle up-down direction. The front end of the connecting member is connected between the front side member and a crash can (a crash box) via a plate-shaped plane portion. Hereby, at the time of a front collision of a vehicle, a collision load that cannot be absorbed by the crash box is transmitted (dispersed) to the front side member and the connecting member by the plane portion, thereby reducing damage to the vehicle.

However, in such a front body structure, since the front end of the connecting member is connected between the front side member and the crash box via the plate-shaped plane portion, rigidity may be decreased in the plane portion. In view of this, when that part of a vehicle-body front portion which is placed on a vehicle-width outer side relative to the front side member has a front end collision with a collision object such as other vehicles (at the time of a so-called short overlap collision), the plane portion is deformed unexpectedly, which may decrease a transmission efficiency of the collision load between the connecting member and the front side member.

SUMMARY OF THE INVENTION

The present invention provides an automobile vehicle-body front structure that is able to improve a transmission efficiency of a collision load between a front side member and a connecting member configured to connect an apron upper member to the front side member.

An automobile vehicle-body front structure according to one aspect of the present invention includes: a front side member extending in a vehicle front-rear direction along a side of a compartment in front of a cabin; an apron upper member provided on a vehicle upper side and a vehicle-width outer side relative to the front side member, the apron upper member extending along the vehicle front-rear direction; a connecting member including a rear end fixed to a front end of the apron upper member, the connecting member including a front end and a front part adjacent the front end, the front end of the connecting member fixed to a front part of the front side member, the connecting member including a reinforcement portion provided at the front part of the connecting member; and a protruding member protruding outwardly in a vehicle width direction from the front part of the front side member, the protruding member being opposed to a rear side of the front part of the connecting member in the vehicle front-rear direction.

Note that "to be opposed" in the automobile vehicle-body front structure includes the following cases: a case where the protruding member is opposed to the front part of the connecting member via a gap; a case where the front part of the connecting member abuts with the protruding member; a case where the front part of the connecting member is joined to the protruding member; and the like cases.

In the above aspect, when a collision load caused at the time of a front end collision is input into the front part of the connecting member, the protruding member protruding outwardly in the vehicle width direction from the front part of the front side member is able to interfere with the front part of the connecting member from the vehicle rear side. This makes it possible to improve a transmission efficiency of the collision load between the connecting member and the front side member. Besides, the front part of the connecting member is reinforced, thereby making it possible to restrain the front part of the connecting member from being deformed by the collision load from the vehicle front side. Hereby, it is possible to improve a load transmission efficiency at the time when the collision load is transmitted to the front side member from the front part of the connecting member via the protruding member.

The automobile vehicle-body front structure may be configured such that: the protruding member is provided with a load transmission portion inclined inwardly in the vehicle width direction as the load transmission portion extends rearwardly in the vehicle front-rear direction; and the load transmission portion is provided between the front part of the connecting member and the front side member.

In the automobile vehicle-body front structure, the protruding member includes the load transmission portion inclined as described above. Accordingly, when the collision load is input into the front part of the connecting member from the vehicle front side, it is possible to successfully transmit the load to the front side member via the load transmission portion. Further, it is possible to centralize a stress on the front side member around a rear end of the load transmission portion, thereby making it possible to effectively bend the front side member inwardly in the vehicle width direction so as to abut with a power unit or the like. This makes it possible to successfully disperse part of the collision load to that side of a vehicle body which is opposite to a collision side via the power unit or the like.

The automobile vehicle-body front structure may be configured such that the connecting member is formed in a hollow shape, and a reinforcing member is attached inside a section of the front part of the connecting member.

According to such a configuration, it is possible to reinforce the front part of the connecting member with a simple structure.

The automobile vehicle-body front structure may be configured such that a vehicle-width outer surface of the front part of the connecting member is curved or inclined outwardly in the vehicle width direction as the vehicle-width outer surface extends rearwardly in the vehicle front-rear direction toward the vehicle rear side.

In the automobile vehicle-body front structure, when a vehicle has a short overlap collision with a collision object such as the other vehicles, for example, the vehicle-width outer surface of the front part of the connecting member makes slide contact with the collision object directly or indirectly, thereby making it possible to act a force on the vehicle-body front part to move away from the collision object in a lateral direction (the vehicle width direction). As a result, it is possible to effectively reduce the collision load input into the vehicle-body front portion from the collision object, thereby making it possible to largely restrain deformation of a passenger compartment.

The automobile vehicle-body front structure may be configured such that a rear face of the protruding member is inclined in such a manner that a distance between the rear face of the protruding member and the front side member decreases as the rear face of the protruding member extends rearward in the vehicle front-rear direction.

In the automobile vehicle-body front structure, when the front side member is bent inwardly in the vehicle width direction due to the collision load input into the protruding member from the front part of the connecting member, a rear end of the protruding member serves as a starting point of the bending. In this regard, since the automobile vehicle-body front structure is configured as described above, even in a case where the rear end of the protruding member is disposed further closer to the vehicle rear side so that a bending portion of the front side member abuts with a power unit or the like, it is possible to restrain upsizing of the protruding member.

The automobile vehicle-body front structure may be configured such that the protruding member is formed in a triangular shape in a plane view.

The automobile vehicle-body front structure may be configured such that the front part of the front side member is provided adjacent a front most end of the front side member in the vehicle front-rear direction.

As described above, according to the automobile vehicle-body front structure of one aspect of the present invention, it is possible to improve a transmission efficiency of a collision load between the front side member and the connecting member configured to connect the apron upper member to the front side member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

<First Embodiment> The following describes an automobile vehicle-body front structure 10 (hereinafter just referred to as "vehicle-body front structure 10") according to a first embodiment of the present invention with reference to FIGS 1 to 4. Note that an arrow FR, an arrow UP, and an arrow OUT, which are shown appropriately in each figure, indicate a vehicle-body front direction (a traveling direction), a vehicle-body upper direction, and a vehicle-body outer side in a vehicle width direction, respectively. Hereinafter, in a case where a description is made by use of merely a front-rear direction, an up-down direction, and a right-left direction, they indicate front and rear of a vehicle front-rear direction, up and down of a vehicle up-down direction, and right and left of a vehicle right-left direction (i.e. vehicle width direction), respectively, unless otherwise specified.

Figure 1:
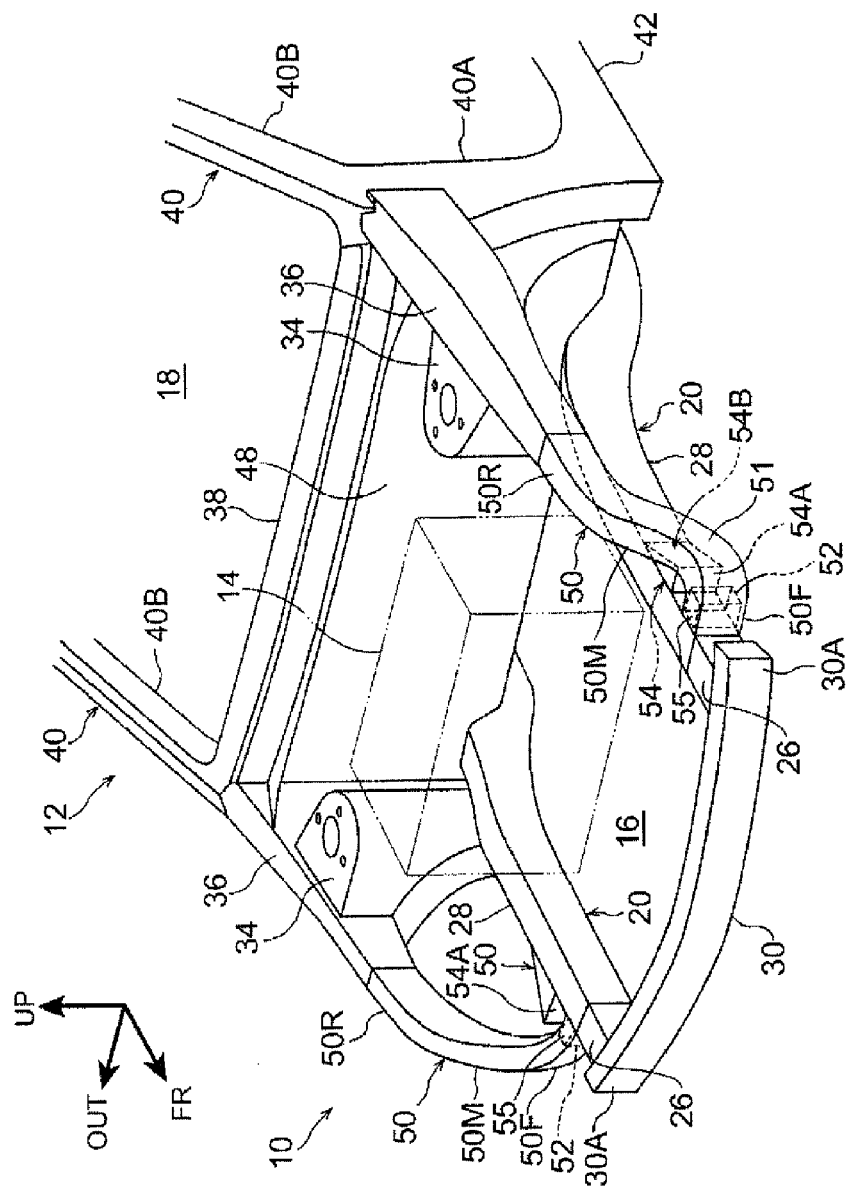
FIG. 1 is a perspective view illustrating a configuration of a main part of an automobile vehicle-body front portion to which an automobile vehicle-body front structure according to a first embodiment of the present invention is applied.
Figure 2:
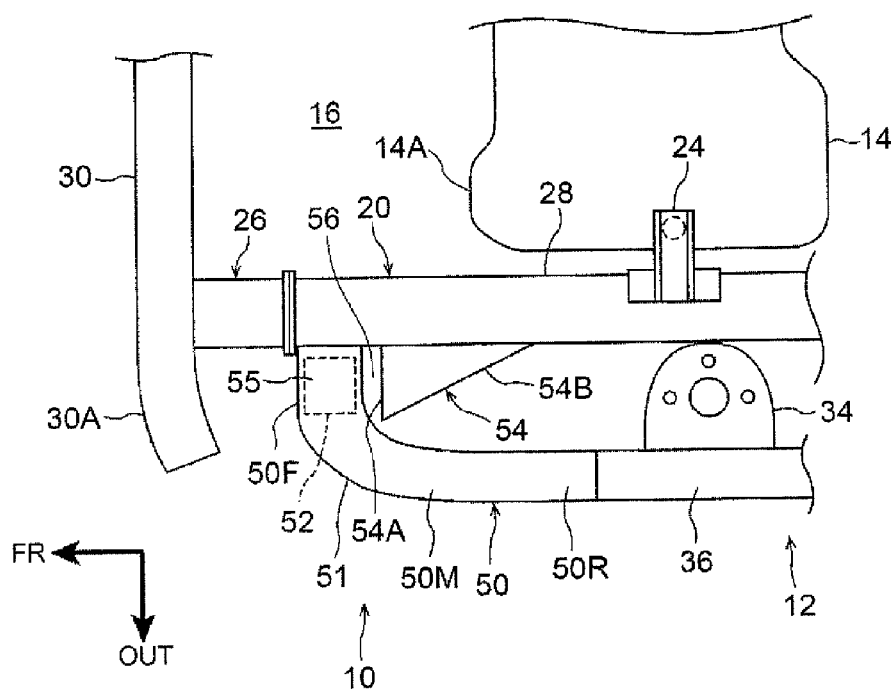
FIG. 2 is a plane view of part of the configuration illustrated in FIG. 1 when viewed from a vehicle upper side.
Figure 3:
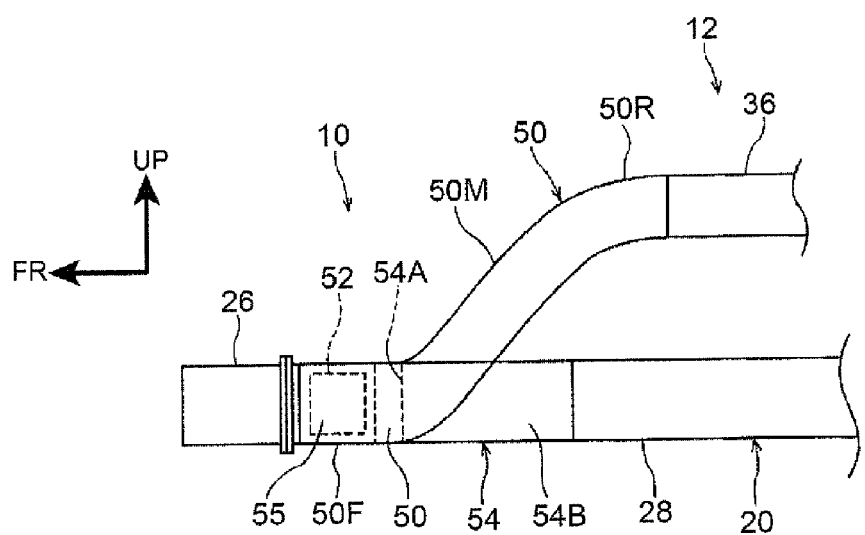
FIG. 3 is a side view of part of the configuration illustrated in FIG. 1 when viewed from a vehicle-width outer side.

(Configuration) As illustrated in FIG. 1, an automobile 12 to which the vehicle-body front structure 10 is applied is a sedan-type vehicle, for example. In the automobile 12, an engine compartment 16 is formed in a vehicle-body front portion provided on a vehicle front side relative to a cabin 18 (a passenger compartment). In the engine compartment 16, a power unit 14 constituted by an engine, a motor, and the like is accommodated. Paired right and left front side members 20 are provided at respective sides of a lower part of the engine compartment 16 in the vehicle width direction, Since the vehicle-body front structure 10 is configured basically in a symmetric manner, a right side of the vehicle body is not illustrated in FIGS. 2 to 4.

The right and left front side members 20 are frame members for a vehicle body which frame members are formed to have a rectangular closed section when viewed from the vehicle front-rear direction, and are disposed on respective sides of the vehicle-body front portion with the vehicle front-rear direction being taken as a longitudinal direction. Respective engine mounts 24 (not shown except in FIGS. 2 and 4) are attached to top faces of the right and left front side members 20, and the power unit 14 is supported by the right and left front side members 20 via the respective engine mounts 24.

Crash boxes 26 serving as impact absorption portions are provided in respective front parts of the right and left front side members 20. The crash boxes 26 are formed separately from side-member main bodies 28 serving as body portions of the front side members 20, and are fixed to front ends of the side-member main bodies 28 by means of bolt fastening or the like.

The right and left crash boxes 26 are formed to have a rectangular closed section when viewed from the vehicle front-rear direction, for example, and the crash boxes 26 are set to have a lower rigidity (offset yield strength) with respect to an axial compression load along the vehicle front-rear direction, than the side-member main bodies 28. The crash boxes 26 are each configured such that at the time when the automobile 12 has a front end collision (front collision), the crash box 26 absorbs an energy by deforming before the side-member main body 28 deforms. A bumper reinforcement 30 disposed in the vehicle-body front portion with the vehicle width direction being taken as a longitudinal direction is fixed to front ends of the right and left crash boxes 26 by means of bolt fastening or the like.

The bumper reinforcement 30 is a so-called B-shaped section type of which a sectional shape viewed from the vehicle width direction is formed in a generally B shape, for example, and includes right and left bumper extending portions 30A extending outwardly in the vehicle width direction beyond the right and left crash boxes 26. The right and left bumper extending portions 30A are curved gently toward a vehicle rear side as they extend outwardly in the vehicle width direction. An absorber (a cushioning material; not shown) made from a foam material or the like is attached to a front end face of the bumper reinforcement 30, and the absorber and the bumper reinforcement 30 are covered with a bumper cover (not shown).

Further, paired right and left suspension towers 34 are provided on vehicle upper sides of the right and left front side members 20 in respective side parts of the engine compartment 16 in the vehicle-width direction. Respective lower ends of the right and left suspension towers 34 are connected to the right and left front side members 20, respectively. The right and left suspension towers 34 each support an upper part of a suspension device (not shown), and suspension arms provided in the suspension device are supported by suspension members (not shown) attached to bottom faces of the right and left front side members 20.

Further, upper ends of the right and left suspension towers 34 are connected to right and left apron upper members 36 extending in the vehicle front-rear direction, at the vehicle upper sides and vehicle-width outer sides of the right and left front side members 20, respectively. Rear ends of the right and left apron upper members 36 are connected to respective vehicle-width ends of a cowl 38 extending in the vehicle width direction. The cowl 38 is provided in a boundary portion between the cabin 18 and the engine compartment 16.

The respective vehicle-width ends of the cowl 38 are connected to right and left front pillars 40. The right and left front pillars 40 are each constituted by: a pillar lower 40A extending in the vehicle up-down direction; and a pillar upper 40B extending from an upper end of the pillar lower 40A toward a vehicle upper side and the vehicle rear side. A rear end of the foregoing apron upper member 36 is connected to a connection portion between the pillar lower 40A and the pillar upper 40B in each of the front pillars 40. Further, a front end of a rocker 42 extending in the vehicle front-rear direction is connected to a lower end of each of the pillar lowers 40A. Further, a dash panel 48 configured to partition (section) the cabin 18 and the engine compartment 16 is provided on a vehicle lower side of the cowl 38.

In the automobile 12 thus configured, a front side relative to the dash panel 48 is a crushable zone. At the time when the automobile 12 has a front end collision, the crash box 26, the front side member 20, and the like are positively deformed to absorb a collision energy, so that the cabin 18 provided on a rearward side is not deformed. Note that such a configuration can be realized by a well-known method in which beads are formed in the front side member 20.

Next will be described a main part of the first embodiment. As illustrated in FIGS. 1 to 4, in the vehicle-body front structure 10, a front end of the apron upper member 36 is connected to the front part of the front side member 20 (here, a front part of the side-member main body 28) via a connecting member 50. The connecting member 50 is formed from a metal material in a hollow, squarely-cylindrical shape, for example. A rear end of the connecting member 50 is fixed to the front end of the apron upper member 36 by means of bolt fastening or the like.

A rear part 50R of the connecting member 50 extends in the vehicle front-rear direction at a height equivalent to the apron upper member 36, and an intermediate portion 50M of the connecting member 50 extends obliquely downward toward the vehicle front side from a front end of the rear part 50R. A front part 50F of the connecting member 50 is placed at a height equivalent to the front side member 20, and placed at a lateral side of the front part of the side-member main body 28. The front part 50F is placed in vicinity to a vehicle rear part of the crash box 26, and is opposed to the bumper extending portion 30A via a space with a front-rear length equivalent to that of the crash box 26.

Further, the front part 50F is bent inwardly in the vehicle width direction at a generally right angle from a front end of the intermediate portion 50M, and extends horizontally toward the side-member main body 28. A tip of the front part 50F (a front end of the connecting member 50) is fixed to that outer wall of the side-member main body 28 which is an outer side part thereof in the vehicle width direction, by means of bolt fastening or the like, for example. The front part 50F has a curved surface 51 curved outwardly in the vehicle width direction as a vehicle-width outer surface thereof extends rearwardly in the vehicle width direction toward the vehicle rear side. The curved surface 51 is formed over a front side of the intermediate portion 50M.

A bulk head 52 serving as a reinforcing member is attached inside a section (an inner side) of the front part 50F of the connecting member 50 in a fitting manner. The bulk head 52 is formed from a metal plate material in a hollow, rectangular-box shape, for example, and is fixed to the front part 50F by means of bolt fastening or the like. That part of the front part 50F to which the bulk head 52 is fitted is a high-rigidity portion 55 (a reinforced or reinforcement portion) reinforced by the bulk head 52. The high-rigidity portion 55 has a rigidity higher than at least that part of the connecting member 50 which is adjacent to the high-rigidity portion 55. Note that a fixation method of the connecting member 50 to the apron upper member 36 and to the front side member 20, and a fixation method of the bulk head 52 to the connecting member 50 are not limited to the bolt fastening, and various methods such as welding and rivet fastening can be used. Further, the connecting member 50 is not limited to the squarely cylindrical shape, and the connecting member 50 may be formed from a pipe having a circular section.

In the meantime, a protruding member 54 (gusset: spacer) is attached to the front part of the side-member main body 28, behind a vehicle rear side of the front part 50F of the connecting member 50. The protruding member 54 is formed from a metal material in a hollow, triangle-pole shape, for example, and protrudes outwardly in the vehicle width direction from the front part of the side-member main body 28, behind the vehicle rear side of the crash box 26 (protrudes outwardly in the vehicle width direction from that part of the front side member 20 which is placed on the vehicle rear side of the crash box 26).

The protruding member 54 is fastened and fixed to that outer wall of the side-member main body 28 which is an outer wall portion thereof in the vehicle width direction, by means of bolt fastening or the like, for example. Note that a material (quality of material) of the protruding member 54 is not limited to metal, and may be resin, for example. Further, a fixation method of the protruding member 54 to the front side member 20 is not limited to the fastening, and various methods such as welding, adhesion, rivet fastening can be used, for example. Further, the protruding member 54 may be formed integrally with the side-member main body 28 of the front side member 20.

The protruding member 54 is formed in a right-angled triangular shape in a plane view. While a front face 54A thereof is disposed along the vehicle width direction, a rear face 54B thereof is inclined in such a manner that a distance between the rear face of the protruding member and the front side member decreases as the rear face of the protruding member extends rearward in the vehicle front-rear direction. The front face 54A is opposed to the vehicle rear side of the front part 50F of the connecting member 50 via a gap 56. Further, an inner end (a rear end) of the rear face 54B in the vehicle width direction is placed on the vehicle rear side relative to a vehicle front-side end 14A of the power unit 14 in a plane view, and on the vehicle front side relative to a generally center portion (the engine mount 24) of the power unit 14 in the vehicle front-rear direction.

Figure 4:
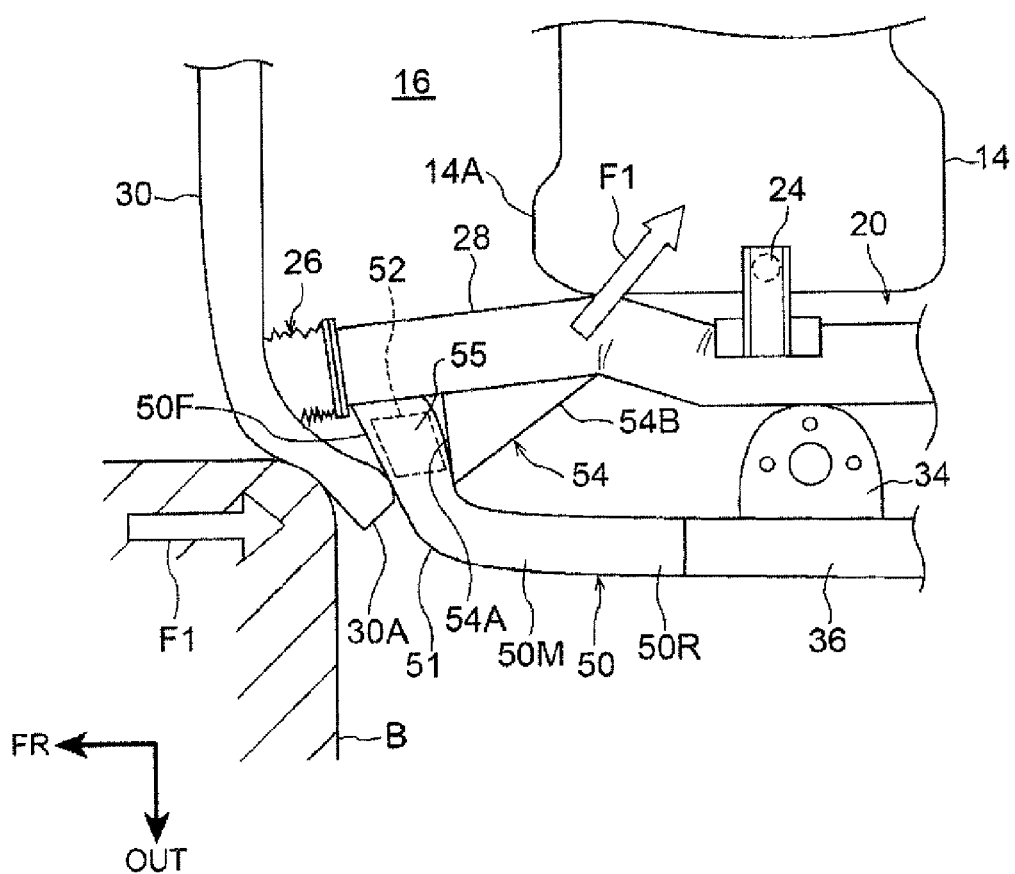
FIG. 4 is a plane view corresponding to FIG. 2 to illustrate a state at the time when the automobile has a short overlap collision.

Here, in the first embodiment, when that part of the automobile 12 which is placed on an outer side relative to the front side member 20 in the vehicle-width direction has a front end collision with a collision object (herein, a barrier B) such as the other vehicles (at the time of a so-called short overlap collision), the crash box 26 is deformed in an axially compressive manner in the vehicle front-rear direction due to a collision load F from the vehicle front side, as illustrated in FIG. 4. Further, at this time, the bumper extending portion 30A is bent toward the vehicle rear side by the collision load F, so as to abut (collide) with the front part 50F of the connecting member 50 from the vehicle front side. Hereby, the collision load F is partially transmitted (dispersed) to the apron upper member 36 via the connecting member 50.

Further, as illustrated in FIG. 4, when the front part 50F of the connecting member 50 is deformed toward the vehicle rear side by the collision load F, the protruding member 54 interferes (abuts) with the front part 50F from the vehicle rear side. Hereby, the collision load F input into the front part 50F is partially transmitted (dispersed) to the side-member main body 28 via the protruding member 54.

Note that, depending on a collision form, the crash box 26 may be buckled without being deformed in an axially compressive manner. Further, since an offset yield strength of the crash box 26 to the collision load F is set lower than that of the bumper reinforcement 30, the crash box 26 is generally deformed earlier than the bumper extending portion 30A.

(Operations and Effects) Next will be described operations and effects of the first embodiment. In the vehicle-body front structure 10 configured as such, the front end of the connecting member 50 fixed to the front end of the apron upper member 36 is fixed to an outer side of the front part of the side-member main body 28 in the vehicle width direction. When the collision load F caused at the time of a front end collision is input into the front part 50F of the connecting member 50, the protruding member 54 protruding outwardly in the vehicle width direction from the front part of the side-member main body 28 is able to interfere with the front part 50F of the connecting member 50 from the vehicle rear side. This increases transmission paths of the collision load F to the side-member main body 28, thereby consequently making it possible to effectively improve a transmission efficiency of the collision load F between the connecting member 50 and the front side member 20.

Further, in the present embodiment, the bulk head 52 is attached inside the section of the high-rigidity portion 55 provided in the front part 50F of the connecting member 50, so that the high-rigidity portion 55 is reinforced by the bulk head 52. This makes it possible to restrain the front part 50F of the connecting member 50 from being deformed by the collision load F from the vehicle front side, thereby making it possible to improve a load transmission efficiency at the time when the collision load F is transmitted to the front side member 20 from the front part 50F of the connecting member 50 via the protruding member 54. Besides, since the bulk head 52 is attached inside the section of the front part 50F of the connecting member 50 formed in a hollow shape, it is possible to reinforce the front part 50F of the connecting member 50 with a simple structure.

Further, in the present embodiment, the front part 50F of the connecting member 50 has the curved surface 51 curved outwardly in the vehicle width direction as the vehicle-width outer surface thereof extends rearwardly in the vehicle front-rear direction toward the vehicle rear side. In view of this, the curved surface 51 makes slide contact with the barrier B directly or indirectly via a bumper cover or the like, thereby making it possible to act a force on the vehicle-body front portion of the automobile 12 to move away from the barrier B in a lateral direction (the vehicle width direction). As a result, it is possible to effectively reduce the collision load F input into the vehicle-body front portion form the barrier B, thereby making it possible to largely restrain deformation of the cabin 18.

Further, in the present embodiment, since the gap 56 is provided between the front part 50F of the connecting member 50 and the protruding member 54 at a normal time, it is possible to prevent occurrence of abnormal noise caused when the front part 50F unexpectedly interferes with the protruding member 54 due to vibration or the like during running.

Further, in the present embodiment, since the protruding member 54 is provided so as to protrude outwardly in the vehicle width direction from the front part of the side-member main body 28, when the collision load F is input into the protruding member 54 from the vehicle front side, a bending moment acts on the side-member main body 28. As a result, as illustrated in FIG. 4, the side-member main body 28 is bent inwardly in the vehicle width direction so as to abut with the power unit 14. This makes it possible to disperse part of the collision load F to that side of the vehicle body which is opposite to a collision side via the power unit 14 (see an arrow F1 in FIG. 4).

In addition, that rear face 54B of the protruding member 54 fixed to the front end of the side-member main body 28 is inclined in such a manner that a distance between the rear face of the protruding member and the front side member decreases as the rear face of the protruding member extends rearward in the vehicle front-rear direction. Accordingly, even in a configuration in which that rear end of the protruding member 54 which serves as a starting point of bending of the front side member 20 is disposed on a lateral side of the power unit 14, it is possible to restrain upsizing of the protruding member 54.

Next will be described another embodiment of the present invention. Note that a configuration/operation basically similar to a configuration/operation of the first embodiment has the same reference sign as the configuration/operation of the first embodiment, and its description is omitted.

Figure 5:
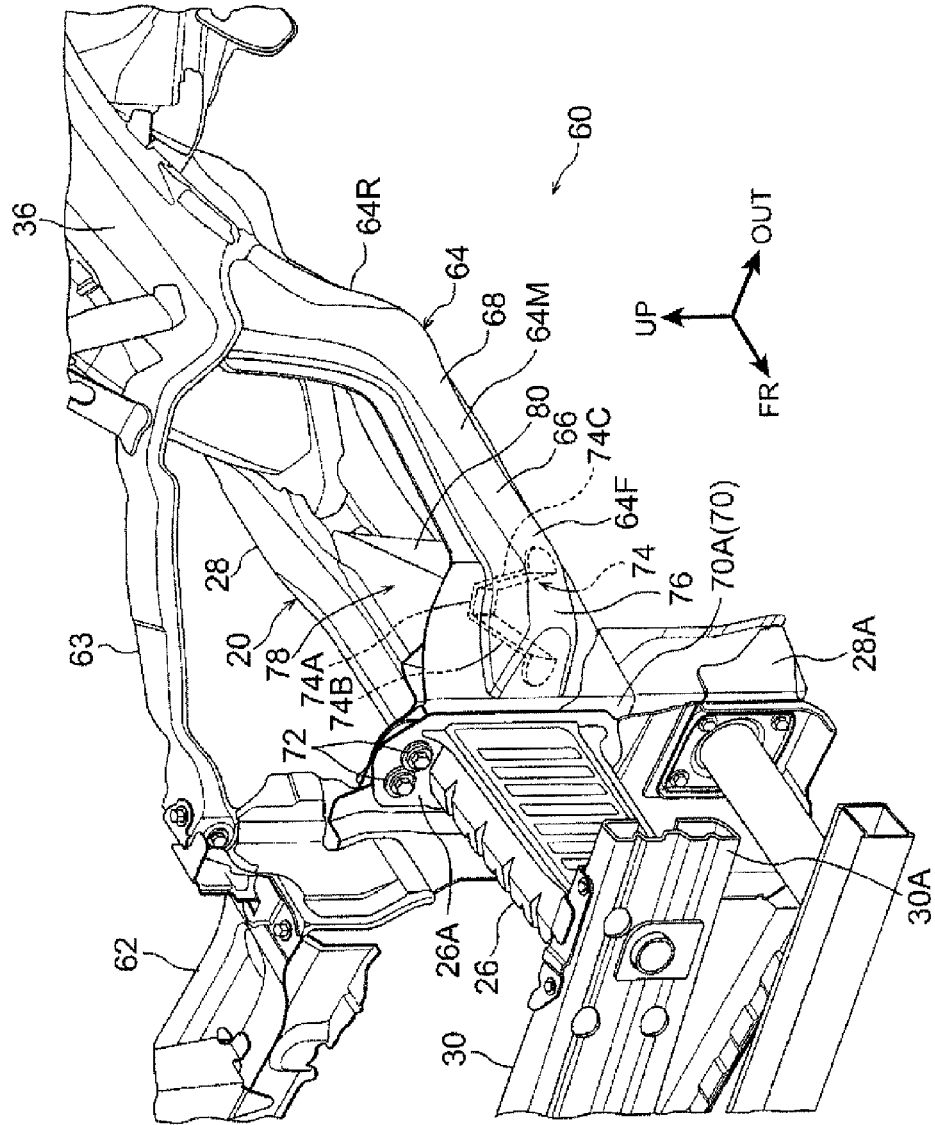
FIG. 5 is a perspective view illustrating a configuration of a main part of a vehicle body front structure according to Embodiment 2 of the present invention.
Figure 6:
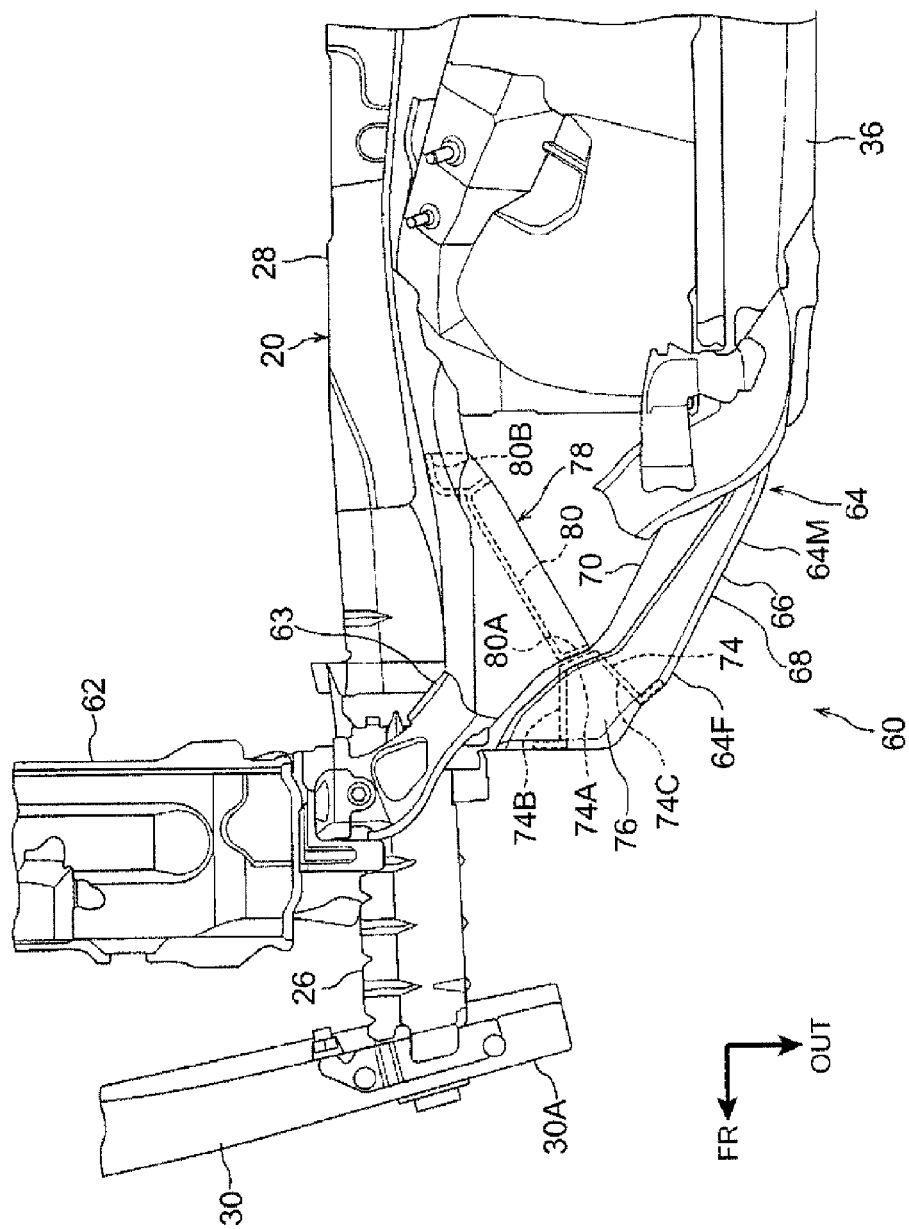
FIG. 6 is a plane view illustrating the configuration.
Figure 7:
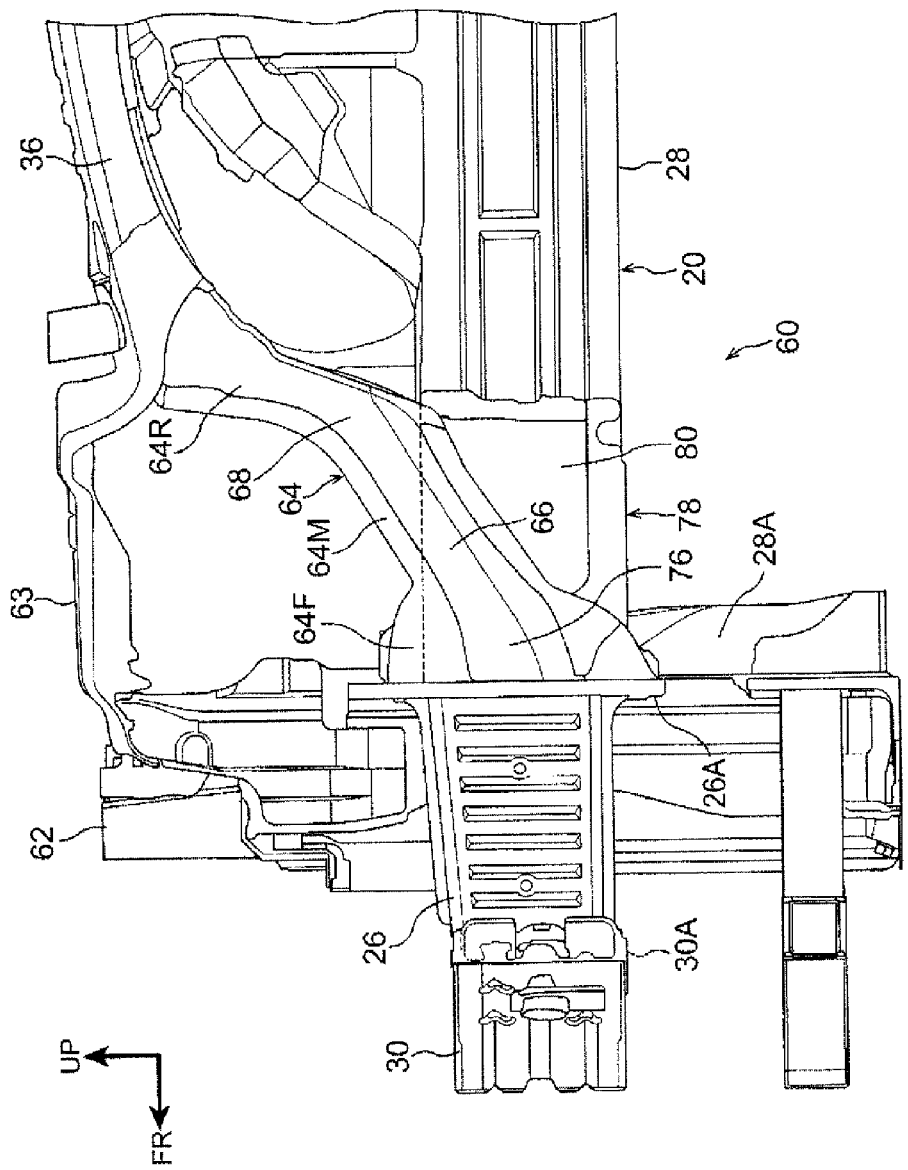
FIG. 7 is a side view illustrating the configuration.

<Second Embodiment> FIG. 5 is a perspective view illustrating a configuration of a main part of a vehicle-body front structure 60 according to a second embodiment of the present invention. Further, FIG. 6 is a plane view of the configuration, and FIG. 7 is a side view of the configuration. Note that, in FIGS. 5 to 7, a member having a reference sign 62 is a radiator support, and a member having a reference sign 63 is an extension connecting the radiator support 62 to an apron upper member 36.

This embodiment basically has a configuration similar to the first embodiment, but a configuration of a connecting member 64 is different from the connecting member 50 according to the first embodiment. Similarly to the connecting member 50, the connecting member 64 is fixed to a front end of the apron upper member 36, and a front end thereof is fixed to a front part of a side-member main body 28. Note that the connecting member 64 is configured such that a rear part 64R extends generally downward from the front end of the apron upper member 36, and an intermediate portion 64M extends obliquely downward toward the vehicle front side from a front end of the rear part 64R. Further, a front part 64F of the connecting member 64 is placed at a height equivalent to a front side member 20, and placed at a lateral side (a vehicle-width outer side) of the front part of the side-member main body 28. A vehicle-width outer surface of the connecting member 64 is a curved surface 66 curved outwardly in the vehicle width direction as the vehicle-width outer surface extends rearwardly in the vehicle front-rear direction toward the vehicle rear side.

Figure 8:
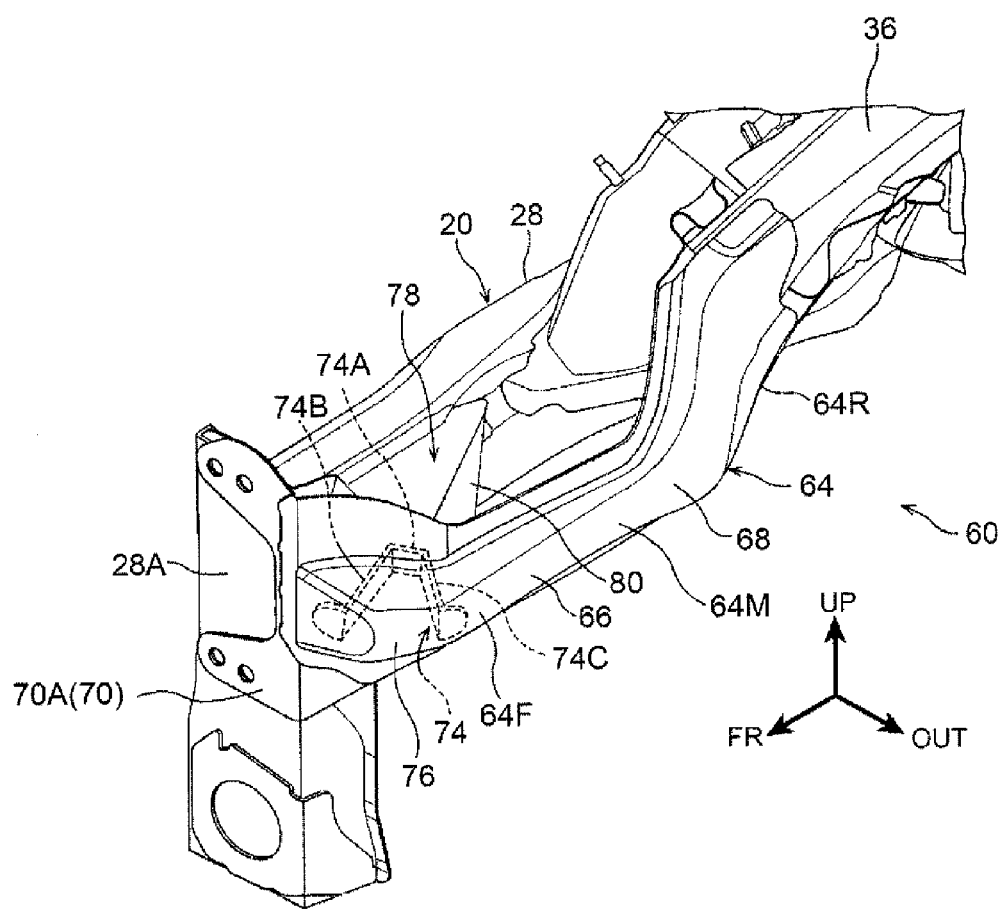
FIG. 8 is a perspective view illustrating a state where a crash box and so on are removed from the configuration.

The connecting member 64 is formed in a hollow shape such that an outer panel 68 having a hat-shaped section that protrudes outwardly in the vehicle width direction is joined, by upper and lower flanges, to an inner panel 70 (see FIG. 6) having a hat-shaped section that protrudes inwardly in the vehicle width direction. On a front-part-64F side of the connecting member 64, the hat-shaped section of the outer panel 68 is maintained, but the inner panel 70 is formed in a flat-plate shape. As illustrated in FIG. 8, a front end of the inner panel 70 is provided with a flat-plate fixed portion 70A projecting inwardly in the vehicle width direction.

A plate-thickness direction of the fixed portion 70A is along the vehicle front-rear direction, and an intermediate part of the fixed portion 70A in an up-down direction is cut out from a vehicle-width inner side. The fixed portion 70A is sandwiched between a flange portion 28A provided in the front end of the side-member main body 28 and a flange portion 26A provided in a rear end of a crash box 26. Two sets of upper and lower bolts 72 in pair (see FIG. 5) penetrating through the flange portions 26A, 28A and the fixed portion 70A are engaged threadedly to respective nuts (not shown), so that the crash box 26 and the fixed portion 70A are fixed to the front end of the side-member main body 28.

A bulk head 74 serving as a reinforcing member is provided in a section of the front part 64F of the connecting member 64. The bulk head 74 is formed in a hat-like shape in a plane view, and includes an inner joining portion 74A joined to the inner panel 70 by means of welding or the like, and paired right and left arm portions 74B, 74C extending from respective vehicle-width ends of the inner joining portion 74A toward the vehicle front side. The arm portion 74B on a vehicle-width inner side is provided generally along the vehicle front-rear direction, and a tip thereof bent inwardly in the vehicle width direction is joined to the outer panel 68 by means of welding or the like. Further, the arm portion 74C on a vehicle-width outer side is inclined outwardly in the vehicle width direction as the arm portion 74C extends rearwardly in the vehicle front-rear direction toward the vehicle front side, and a tip thereof bent toward the vehicle-width outer side and the vehicle rear side is joined to the outer panel 68 by means of welding or the like.

Note that part of the outer panel 68 which constitutes a front end face of the connecting member 64 is formed along the vehicle width direction, and the arm portion 74B of the bulk head 74 is joined to that part. Further, that part of the outer panel 68 which constitutes a vehicle-width outer surface of the connecting member 64 is curved outwardly in the vehicle width direction as that part extends rearwardly in the vehicle front-rear direction toward the vehicle rear side, and the thin portion 74C of the bulk head 74 is joined to that part. That part of the front part 64F of the connecting member 64 at which the bulk head 74 is provided is a high-rigidity portion 76 (a reinforced portion) reinforced by the bulk head 74. The high-rigidity portion 76 has a rigidity higher than at least that part of the connecting member 64 which is adjacent to the high-rigidity portion 76.

Note that, in this embodiment, a protruding member 78 (gusset: spacer) having a configuration basically similar to the protruding member 54 according to the first embodiment is provided. The protruding member 78 is formed in a hollow, triangle pole shape in which a plurality of members each formed from a plate metal material is joined to each other, for example, and protrudes outwardly in the vehicle width direction from the front part of the side-member main body 28, behind the vehicle rear side of the crash box 26. The protruding member 78 is joined to that outer wall of the side-member main body 28 which is an outer wall portion thereof in the vehicle width direction, by means of welding or the like, for example.

The protruding member 78 is provided with a load transmission portion 80 inclined inwardly in the vehicle width direction as the load transmission portion 80 extends rearwardly in the vehicle front-rear direction. The load transmission portion 80 is constituted by a rear wall (a vehicle-width outer wall) of the protruding member 78, and is configured such that its rigidity to a load in the vehicle front-rear direction is higher than that part of the protruding member 78 which is adjacent to the load transmission portion 80. The load transmission portion 80 is provided between the high-rigidity portion 76 of the connecting member 64 and the side-member main body 28.

More specifically, a front end of the load transmission portion 80 is provided with a front joining portion 80A bent along the inner joining portion 74A of the bulk head 74, and the front joining portion 80A, the inner joining portion 74A, and the inner panel 70 are connected to each other by means of welding, bolt fastening, or the like. Further, a rear end of the load transmission portion 80 is provided with a rear joining portion 80B bent along the outer wall of the side-member main body 28, and the rear joining portion 80B and the side-member main body 28 are connected to each other by means of welding, bolt fastening, or the like. That rear face of the protruding member 78 which is constituted by the load transmission portion 80 is inclined in such a manner that a distance between the rear face of the protruding member and the front side member decreases as the rear face of the protruding member extends rearward in the vehicle front-rear direction.

This embodiment basically has a configuration similar to the first embodiment except for the above configuration. Accordingly, even in this embodiment, it is possible to obtain basically the same effect as the first embodiment. In addition, in this embodiment, since the protruding member 78 has the load transmission portion 80 as described above, when a collision load is input into the high-rigidity portion 76 of the connecting member 64 from the vehicle front side, it is possible to successfully transmit the load to the side-member main body 28 via the load transmission portion 80. Since a stress can be centralized on the side-member main body 28 around the rear end of the load transmission portion 80, the side-member main body 28 is effectively bent inwardly in the vehicle width direction so as to abut with the power unit 14.

Further, in the present embodiment, since the front end of the load transmission portion 80 of the protruding member 78 is connected to the high-rigidity portion 76 of the connecting member 64, it is possible to prevent the high-rigidity portion 76 from being unexpectedly distanced from the load transmission portion 80 by the collision load. Further, it is possible to prevent occurrence of abnormal noise caused when the high-rigidity portion 76 unexpectedly interferes with the load transmission portion 80 due to running vibration or the like of the vehicle at a normal time.

<Supplementary Description of Embodiments> In each of the above embodiments, the protruding member 54, 78 is formed in a triangular shape in a plane view, but the present invention is not limited to this, and it is possible to set and change the shape of the protruding member appropriately. For example, the protruding member may be formed in a trapezoidal shape or a semicircular shape that projects outwardly in the vehicle width direction in a plane view.

Further, in each of the above embodiments, the crash box 26 as the impact absorption portion is fixed to the side-member main body 28 of the front side member 20, but the present invention is not limited to this, and the shock absorption portion may be provided integrally with the front part of the front side member. In that case, the front end of the connecting member is fixed to that part of the front side member which is placed on the vehicle rear side relative to the impact absorption portion.

Further, in each of the above embodiments, the bulk head 52, 74 as the reinforcing member is attached inside the section of the front part 50F, 64F of the connecting member 50, 64 formed in a hollow shape, so as to reinforce the front part 50F, 64F. However, the present invention is not limited to this, and the reinforcing member may be omitted. In that case, the front part of the connecting member may be formed thicker (a plate thickness of a material is increased) than the other parts of the connecting member (at least a part adjacent to the front part of the connecting member), thereby reinforcing the front part of the connecting member. Further, it is preferable that the front part of the connecting member be configured to have a high rigidity to at least a load in the vehicle front-rear direction, and in view of this, one or more beads extending in the vehicle front-rear direction may be formed in the front part of the connecting member.

Further, in each of the above embodiments, the vehicle-width outer surface of the front part 50F, 64F of the connecting member 50, 64 is the curved surface 51, 66 curved outwardly in the vehicle width direction as the vehicle-width outer surface extends rearwardly in the vehicle front-rear direction toward the vehicle rear side. However, the present invention is not limited to this, and the vehicle-width outer surface of the front part of the connecting member may be provided along the vehicle front-rear direction, or may be inclined outwardly in the vehicle width direction as the vehicle-width outer surface extends rearwardly in the vehicle front-rear direction toward the vehicle rear side.

Further, in each of the above embodiments, the bumper extending portion 30A is provided in the bumper reinforcement 30, but the present invention is not limited to this, and the bumper extending portion 30A may be omitted.

In addition, the present invention can be performed with various modifications without departing from a gist of the present invention. Further, it is needless to say that a scope of the present invention is not limited to each of the above embodiments.

What is claimed is:

1. An automobile vehicle-body front structure comprising:
a front side member extending in a vehicle front-rear direction along a side of a compartment in front of a cabin;
an apron upper member provided on a vehicle upper side and a vehicle-width outer side relative to the front side member, the apron upper member extending along the vehicle front-rear direction;
a connecting member including a rear end fixed to a front end of the apron upper member, the connecting member including a front end and a front part adjacent the front end, the front end of the connecting member fixed to a front part of the front side member, the connecting member including a reinforcement portion provided at the front part of the connecting member; and
a protruding member protruding outwardly, in a vehicle width direction from the front part of the front side member, a front face of the protruding member faces a rear side of the front part of the connecting member.

2. The automobile vehicle-body front structure according to claim 1, wherein:
the protruding member is provided with a load transmission portion inclined inwardly in the vehicle width direction as the load transmission portion extends rearwardly in the vehicle front-rear direction; and
the load transmission portion is provided between the front part of the connecting member and the front side member.

3. The automobile vehicle-body front structure according to claim 1, wherein:
the connecting member is formed in a hollow shape, and a reinforcing member is attached inside a section of the front part of the connecting member.

4. The automobile vehicle-body front structure according to claim 2, wherein:
the connecting member is formed in a hollow shape, and a reinforcing member is attached inside a section of the front part of the connecting member.

5. The automobile vehicle-body front structure according to claim 1, wherein:
a vehicle-width outer surface of the front part of the connecting member is curved or inclined outwardly in the vehicle width direction as the vehicle-width outer surface extends rearwardly in the vehicle front-rear direction toward the vehicle rear side.

6. The automobile vehicle-body front structure according to claim 1, wherein:
a rear face of the protruding member is inclined in such a manner that a distance between the rear face of the protruding member and the front side member decreases as the rear face of the protruding member extends rearward in the vehicle front-rear direction.

7. The automobile vehicle-body front structure according to claim 1, wherein:
the protruding member is formed in a triangular shape in a plane view.

8. The automobile vehicle-body front structure according to claim 1, wherein:
the front face of the protruding member is spaced from the front part of the connecting member via a gap.

9. The automobile vehicle-body front structure according to claim 1, wherein:
the front part of the connecting member is joined to the protruding member.

10. The automobile vehicle-body front structure according to claim 1, wherein the front part of the front side member is provided adjacent a front most end of the front side member in the vehicle front-rear direction.

11. The automobile vehicle-body front structure according to claim 1, wherein:
the front end of the connecting member is fixed to a vehicle-width outer side of the front part of the front side member.

* * * * *